US009211817B2

(12) United States Patent
Leese

(10) Patent No.: US 9,211,817 B2
(45) Date of Patent: Dec. 15, 2015

(54) HEIGHT ADJUSTMENT DEVICE

(71) Applicant: Britax Romer Kindersicherheit GmbH, Ulm (DE)

(72) Inventor: Gavin Paul Leese, Ulm (DE)

(73) Assignee: BRITAX RÖMER KINDERSICHERHEIT GMBH, Ulm (DE)

( * ) Notice: Subject to any disclaimer, the term of this patent is extended or adjusted under 35 U.S.C. 154(b) by 88 days.

(21) Appl. No.: 13/712,678

(22) Filed: Dec. 12, 2012

(65) Prior Publication Data

US 2013/0154321 A1    Jun. 20, 2013

(30) Foreign Application Priority Data

Dec. 20, 2011   (DE) .................. 20 2011 109 317 U

(51) Int. Cl.
    *B60N 2/28* (2006.01)
(52) U.S. Cl.
    CPC .................................... *B60N 2/2851* (2013.01)
(58) Field of Classification Search
    CPC .................................................. B60N 2/2851
    USPC ...................................... 297/250.1, 410, 353
    See application file for complete search history.

(56) References Cited

U.S. PATENT DOCUMENTS

| 7,055,903 | B2* | 6/2006 | Balensiefer et al. ...... 297/256.11 |
| 7,066,536 | B2* | 6/2006 | Williams et al. ........... 297/250.1 |
| 2003/0193225 | A1* | 10/2003 | Kain ........................... 297/250.1 |
| 2005/0200177 | A1* | 9/2005 | Balensiefer ................. 297/250.1 |
| 2008/0296951 | A1* | 12/2008 | Goshima et al. .......... 297/378.13 |
| 2009/0212613 | A1* | 8/2009 | Freeman et al. ........... 297/250.1 |
| 2011/0285187 | A1* | 11/2011 | Horton et al. .............. 297/250.1 |
| 2012/0153690 | A1* | 6/2012 | Gaudreau, Jr. ............. 297/250.1 |
| 2012/0242127 | A1* | 9/2012 | Gaudreau, Jr. ............. 297/250.1 |
| 2012/0313413 | A1* | 12/2012 | Hutchinson et al. ....... 297/250.1 |

* cited by examiner

*Primary Examiner* — David R Dunn
*Assistant Examiner* — Jody Giacoman
(74) *Attorney, Agent, or Firm* — Nelson Mullins Riley & Scarborough LLP

(57) ABSTRACT

The object to provide a user-friendly handling for the adjustment of the height of components, in particular head rests is solved by the device for height adjustment of a component of a seat in accordance with the invention which consists of a carrier element carrying the component, a locking element designed and arranged to prohibit height adjustability in a first position and to permit height adjustability in a second position, wherein the locking element is connected with an adjusting element via a motion link, and the adjusting element is pulled upward by pulling means so as to transfer the locking element from the first position to the second position.

8 Claims, 5 Drawing Sheets

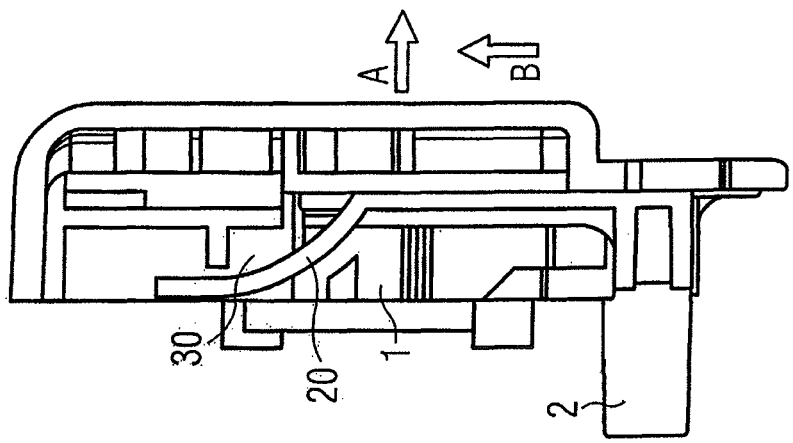
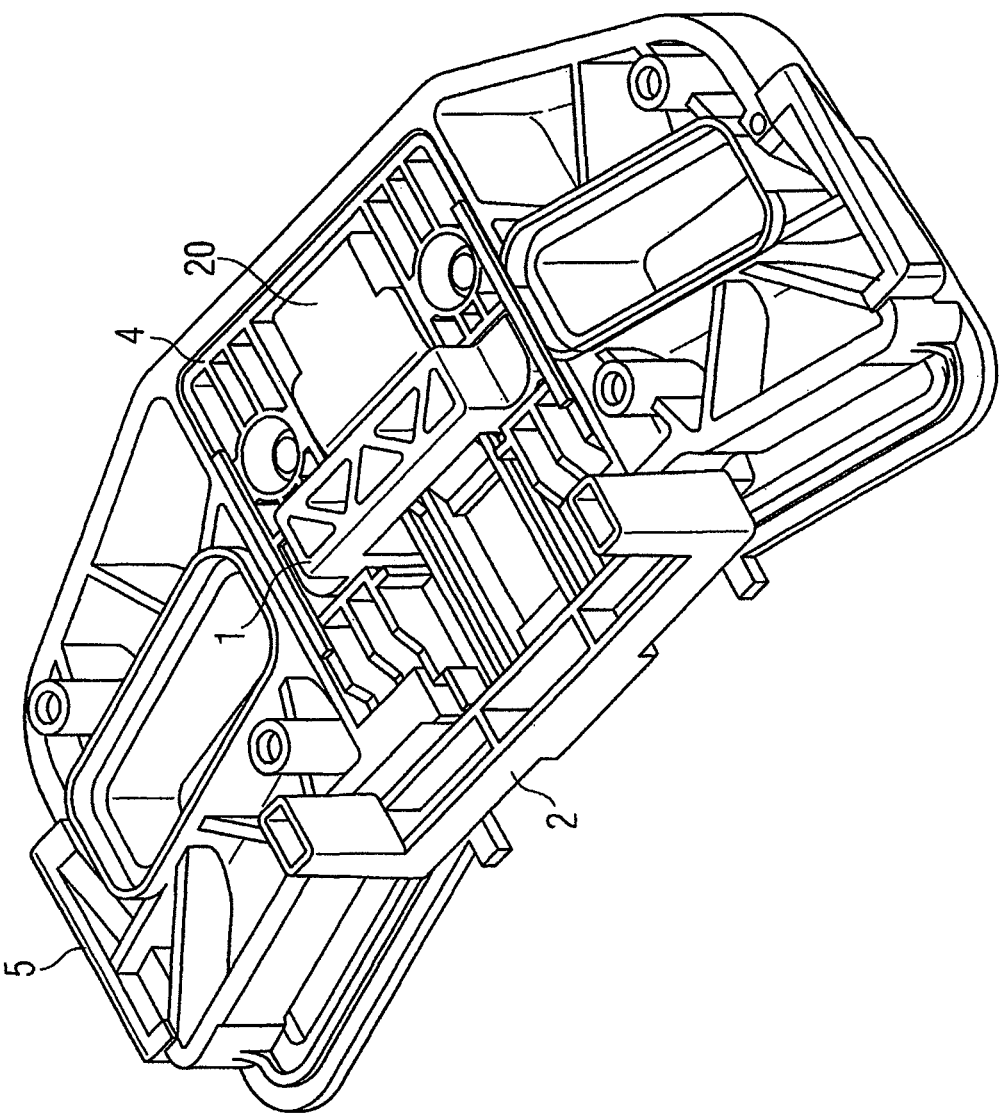

FIG 5
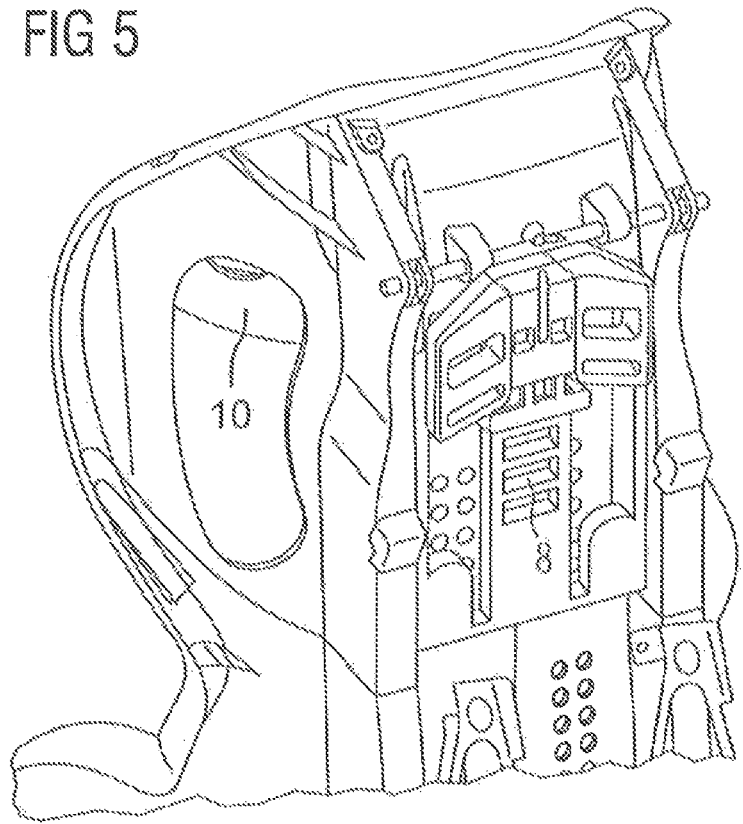
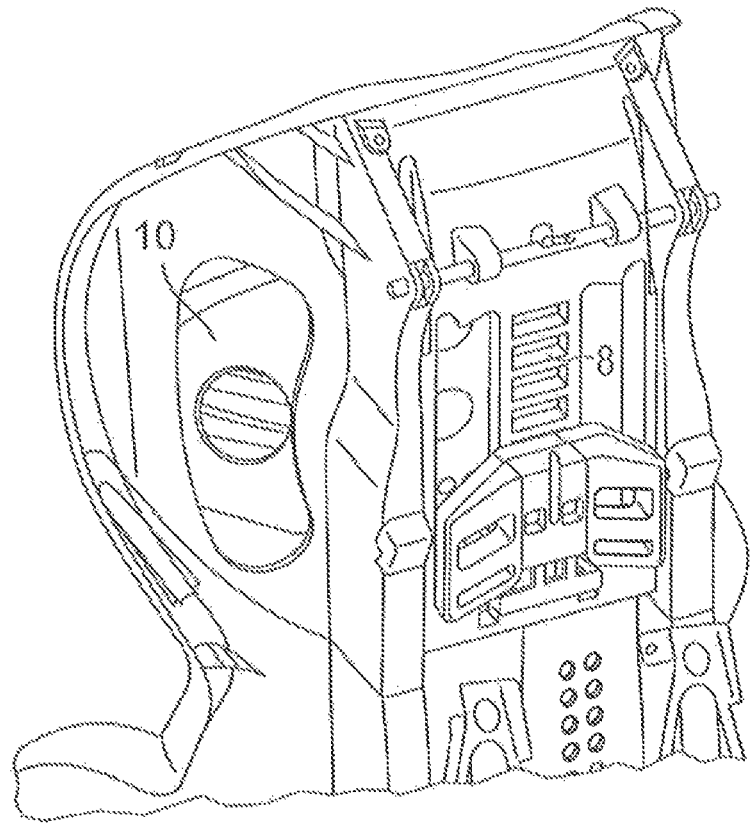

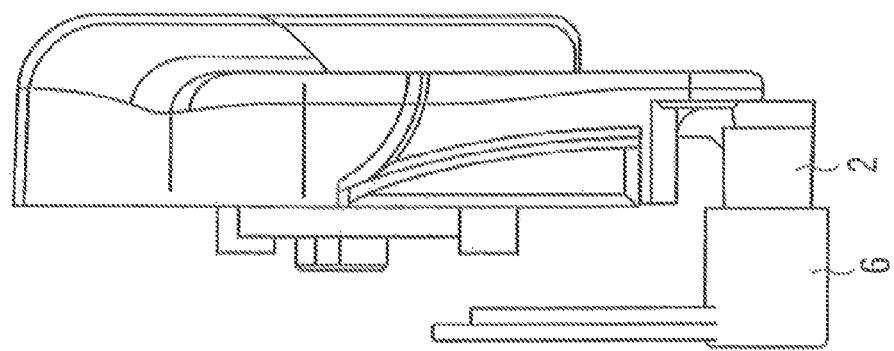
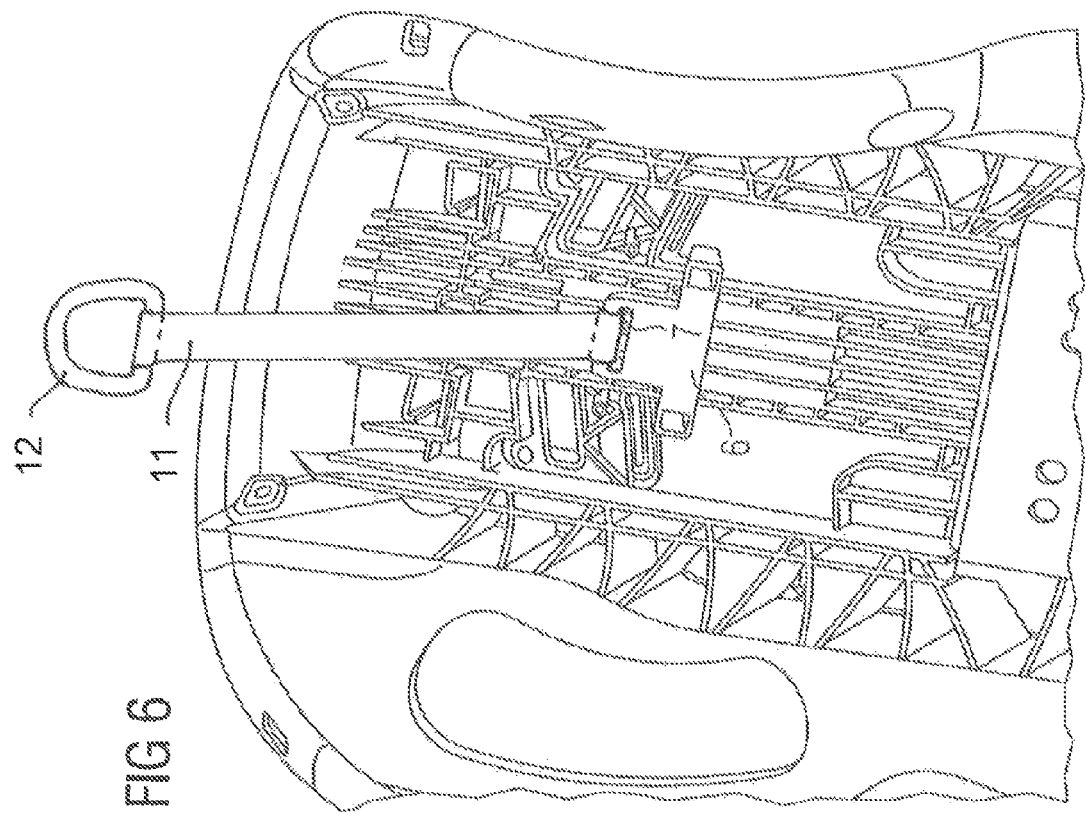

HEIGHT ADJUSTMENT DEVICE

CROSS-REFERENCE TO RELATED APPLICATIONS

This application claims priority to German Patent Application No. 202011109317.8, filed Dec. 20, 2011, which is hereby incorporated herein in its entirety by reference.

FIELD OF THE INVENTION

The subject matter of the present invention is a device for height adjustment of a component of a seat, in particular a child's safety seat for vehicles.

BACKGROUND

In prior art, numerous variants are known for adjusting the height of a component, in particular a head rest of a child's safety seat, wherein it is always necessary in prior art to either perform a height adjustment with two hands, or to carry out a partial disassembly in order to adjust the height of a component, for instance, a head rest. This has proved to be time-consuming and uncomfortable.

SUMMARY OF THE INVENTION

It is therefore an object of the present invention to provide a user-friendly handling for the adjustment of the height of components, in particular head rests.

This object is solved by the device according to the invention with the features of claim 1. Advantageous further developments are indicated in subclaims 2 to 8.

The device for height adjustment of a component of a seat in accordance with the invention consists of a carrier element carrying the component, a locking element designed and arranged to prohibit height adjustability in a first position and to permit height adjustability in a second position, wherein the locking element is connected with an adjusting element via a motion link, and the adjusting element is pulled upward by pulling means so as to transfer the locking element from the first position to the second position.

Advantageously, the component is a head rest of a seat, in particular a child's safety seat for a vehicle.

Advantageously, the locking element engages with positive locking in a structure, wherein the structure is a toothed strip that is advantageously arranged at the rear side of a seat shell of a seat, for instance, a child's safety seat.

In another preferred embodiment of the present invention, the structure is a punched strip or comprises recesses and bumps in which the locking element is adapted to engage with positive locking.

Advantageously, the adjusting element is pulled upward by dimensionally instable means, wherein the dimensionally instable means, for instance, is a belt strap or a cable.

Advantageously, the seat comprises a handling element at the upper end thereof which is connected with the adjusting element by the dimensionally instable means. Expediently, the handling element is a grip or a ring-like element that is, for safety reasons, placed at the upper end of the seat such that inadvertent actuation by the passenger is avoided.

Expediently, the handling element and the dimensionally instable means are connected with the adjusting element such that a certain tensile force has to be applied within the adjusting element to enable raising of the adjusting element. This may, for instance, be effected by means of a coil spring that is biased and whose spring force has to be overcome to raise the adjusting element.

Advantageously, the adjusting element is connected with the locking element by means of a motion link that urges the locking element to be transferred to the second position when the adjusting element is raised, and wherein the adjusting element has a ramp shape along which the locking element is urged to move from a first position to a second position. During this movement that takes place substantially horizontally, the engagement of the locking element in the structure, for instance, the toothed strip, is performed or released.

Due to the ramp shape of the adjusting element, the horizontal movement of the locking element depends exclusively on the vertical movement of the adjusting element. An involuntary movement of the locking element is reliably excluded. Hence, there can be ensured that locking only takes place when the adjusting element is raised.

BRIEF DESCRIPTION OF THE FIGURES

An embodiment of the present invention will be explained in detail by means of figures. There show:

FIG. 3 a perspective illustration of the device according to the invention in the second position;

FIG. 4 a sectional illustration of the device according to the invention in the second position;

FIG. 5 two perspective illustrations of the device according to the invention in different heights; and FIG. 6 two illustrations of means for raising the device according to the invention.

DETAILED DESCRIPTION

Figure 1:
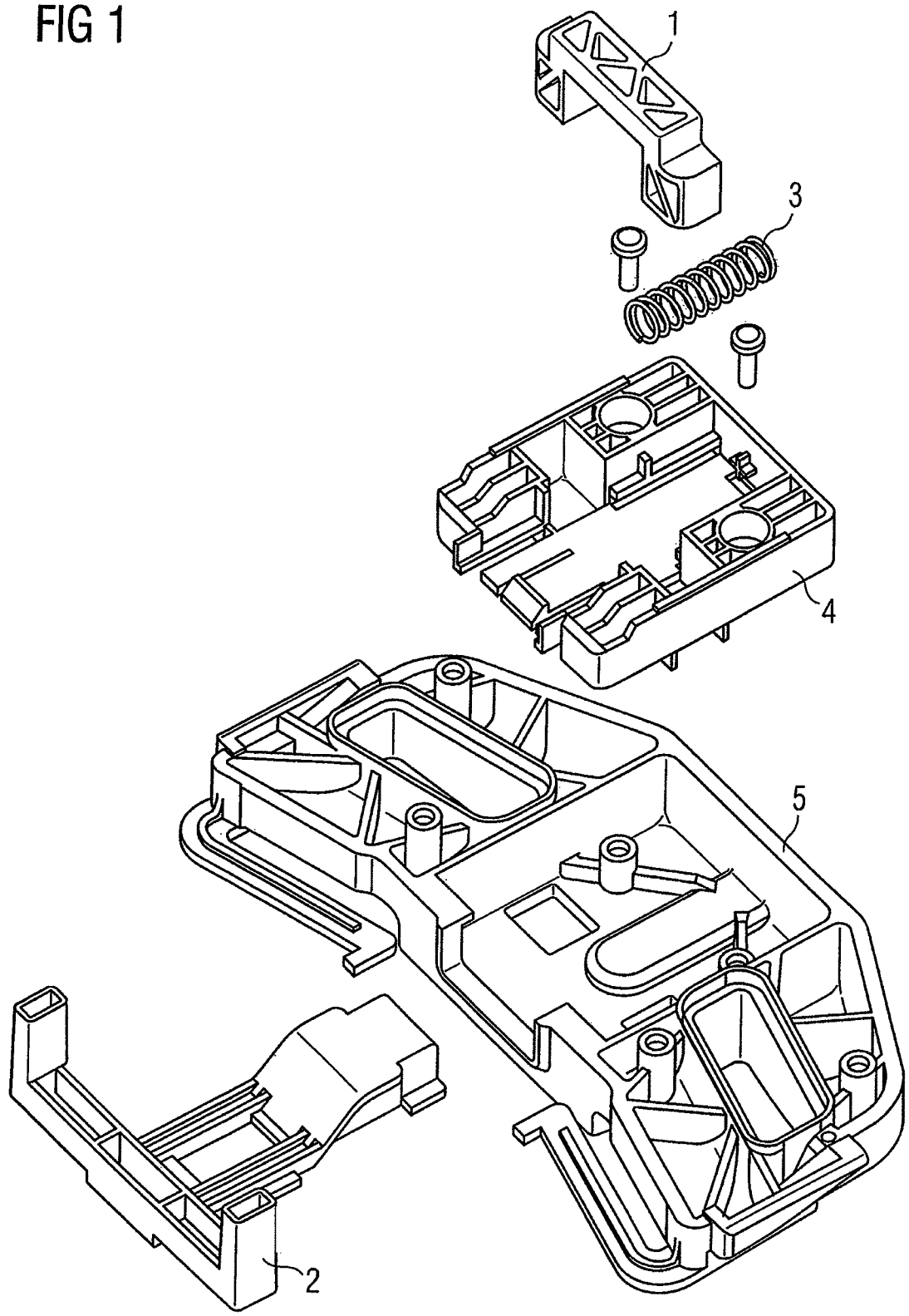
FIG. 1 an exploded view of the device according to the invention.

FIG. 1 shows a carrier element 4 comprising a locking element 1, an adjusting element 2, a tension spring 3, and a housing 5 in which the device according to the invention is arranged.

Figure 2:
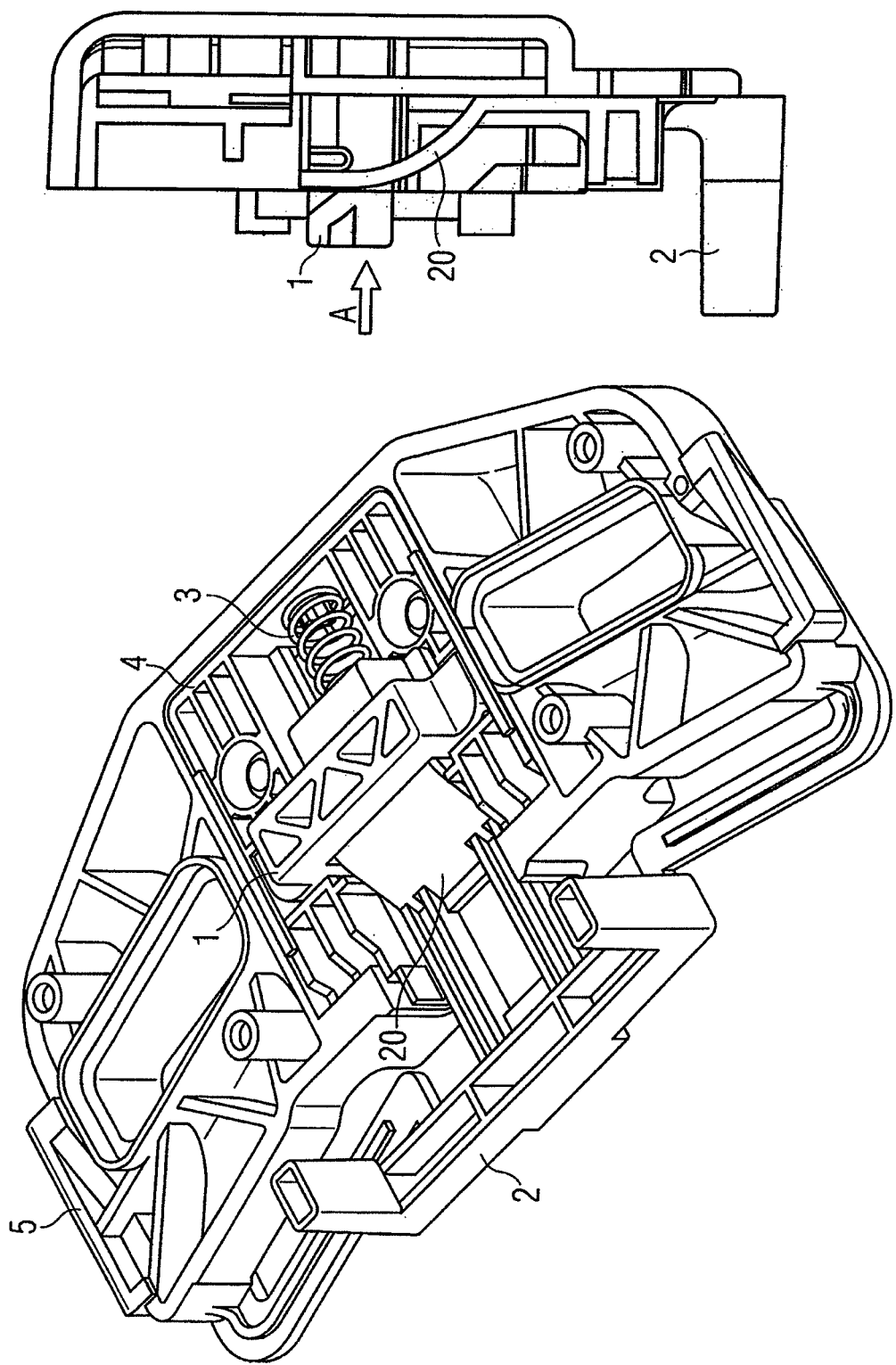
FIG. 2 a sectional and a perspective illustration of the device according to the invention in the first position.

FIG. 2 illustrates the ramp shape 20 of the adjusting element 2 in the first position in which the adjusting element 2 is arranged such that a movement of the locking element 1 in the direction of the arrow A is not possible. In this position, height adjustment is not permitted since the locking element 1 engages in the toothed strip (not illustrated) and evading of the locking element 1 in the direction of the arrow A is not possible since the ramp 20 of the adjusting element 2 does not permit so.

As soon as the adjusting element 2 is raised in accordance with FIGS. 3 and 4 in the direction of arrow B, the locking element 1 moves in the direction of arrow A along the motion link 30 inside the housing 5 and releases the positive-locking connection. In this condition it is possible to raise the carrier element 1 along guide rails (not illustrated) and to thus adapt, for instance, a head rest to the passenger, i.e. to raise it or to lower it. After the height has been adjusted and the tension on the strap that is not illustrated and that is fastened to the adjusting element 2 has become weaker, i.e. has undercut the spring force of the spring 3, the adjusting element 2 is pressed downward due to the spring force, so that the locking element 1 along the motion link 30 is again taken forward into engagement with the toothed rack (not illustrated) and hence establishes a positive-locking connection. In this condition, height adjustability is no longer possible.

FIG. 5 shows two illustrations of the device according to the invention in two heights with a toothed strip 8 and a head rest 10.

FIG. 6 shows two illustrations of an attachment means 6 that is fastened to the adjusting element 2 and comprises a recess 7 for fixing the dimensionally instable pulling means 11, preferably a belt strap, thereto. A handling element 12 is attached to the dimensionally instable pulling means 11.

The invention claimed is:

1. A device for height adjustment of a head rest of a child safety seat, consisting of
    a carrier element carrying the head rest of the child safety seat,
    a locking element configured and arranged to prohibit height adjustability in a first position and to permit height adjustability in a second position,
    an adjusting element configured to be pulled upward by dimensionally instable pulling means,
    a motion link operably connecting the adjusting element and the locking element,
    wherein the adjusting element is configured to transfer the locking element from the first position to the second position via the motion link in response to being pulled upward by the dimensionality instable means, and
    wherein the adjusting element is further configured to transfer the locking element from the second position to the first position via the motion link upon release of the dimensionally instable pulling means via a driving element biasing the adjusting element.

2. The device for height adjustment according to claim 1, wherein the locking element engages with positive locking in a structure.

3. The device for height adjustment according to claim 2, wherein the structure is a toothed strip.

4. The device for height adjustment according to claim 3, wherein the toothed strip is arranged at the rear side of a seat shell.

5. The device for height adjustment according to claim 1, wherein the seat comprises a handling element at the upper end thereof which is connected with the adjusting element via the dimensionally instable pulling means.

6. The device for height adjustment according to claim 1, wherein the motion link urges the locking element to be transferred to the second position, and wherein the adjusting element has a ramp shape.

7. The device for height adjustment according to claim 1, wherein the motion link urges the locking element to be transferred to the second position.

8. The device for height adjustment according to claim 1, wherein the adjusting element has a ramp shape.

* * * * *